June 28, 1960     L. E. MEYER     2,942,835
AUTOMATIC WEIGHER FOR CATTLE FEED
Filed May 8, 1958     4 Sheets-Sheet 1
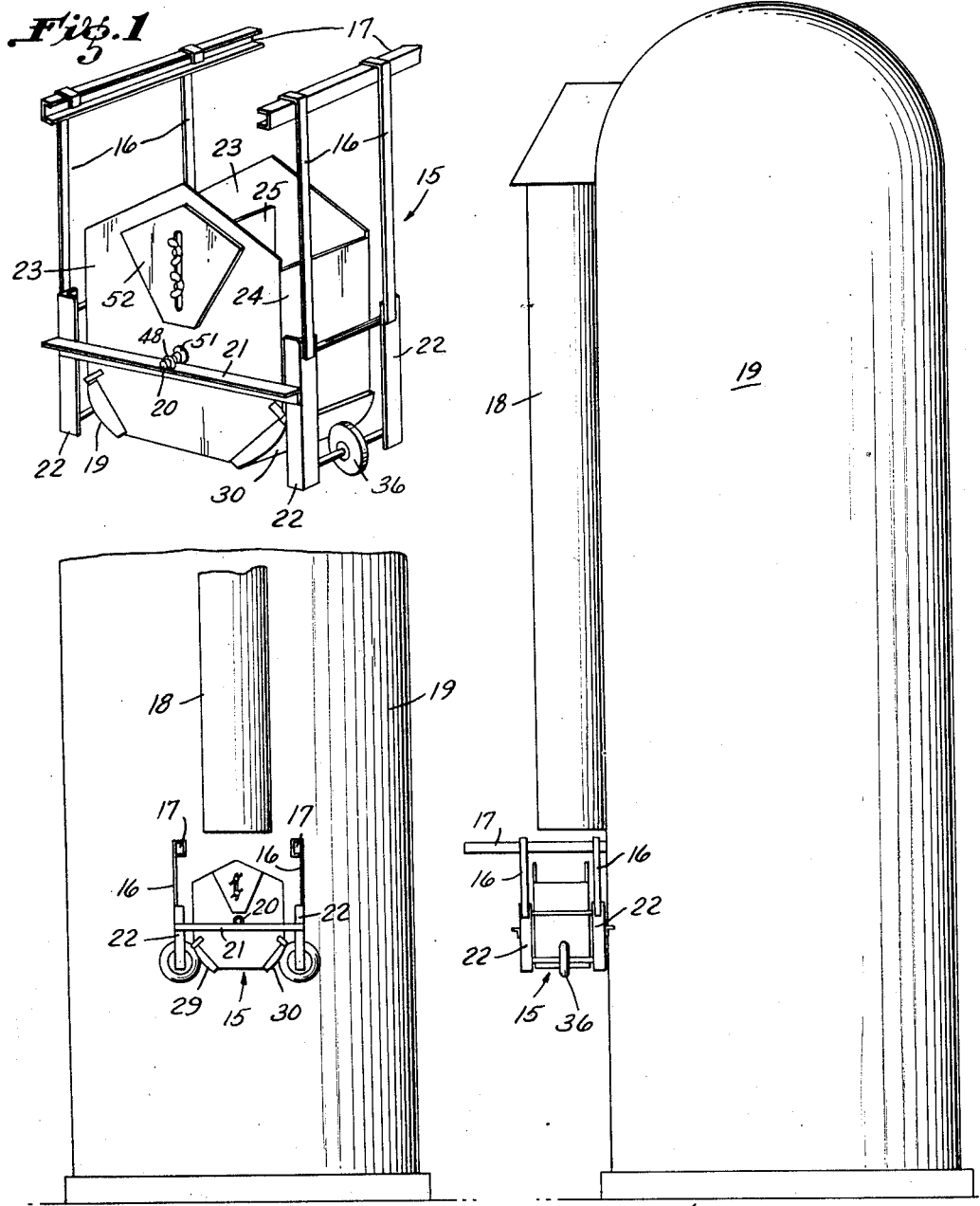
INVENTOR
Lester E. Meyer
ATTORNEYS

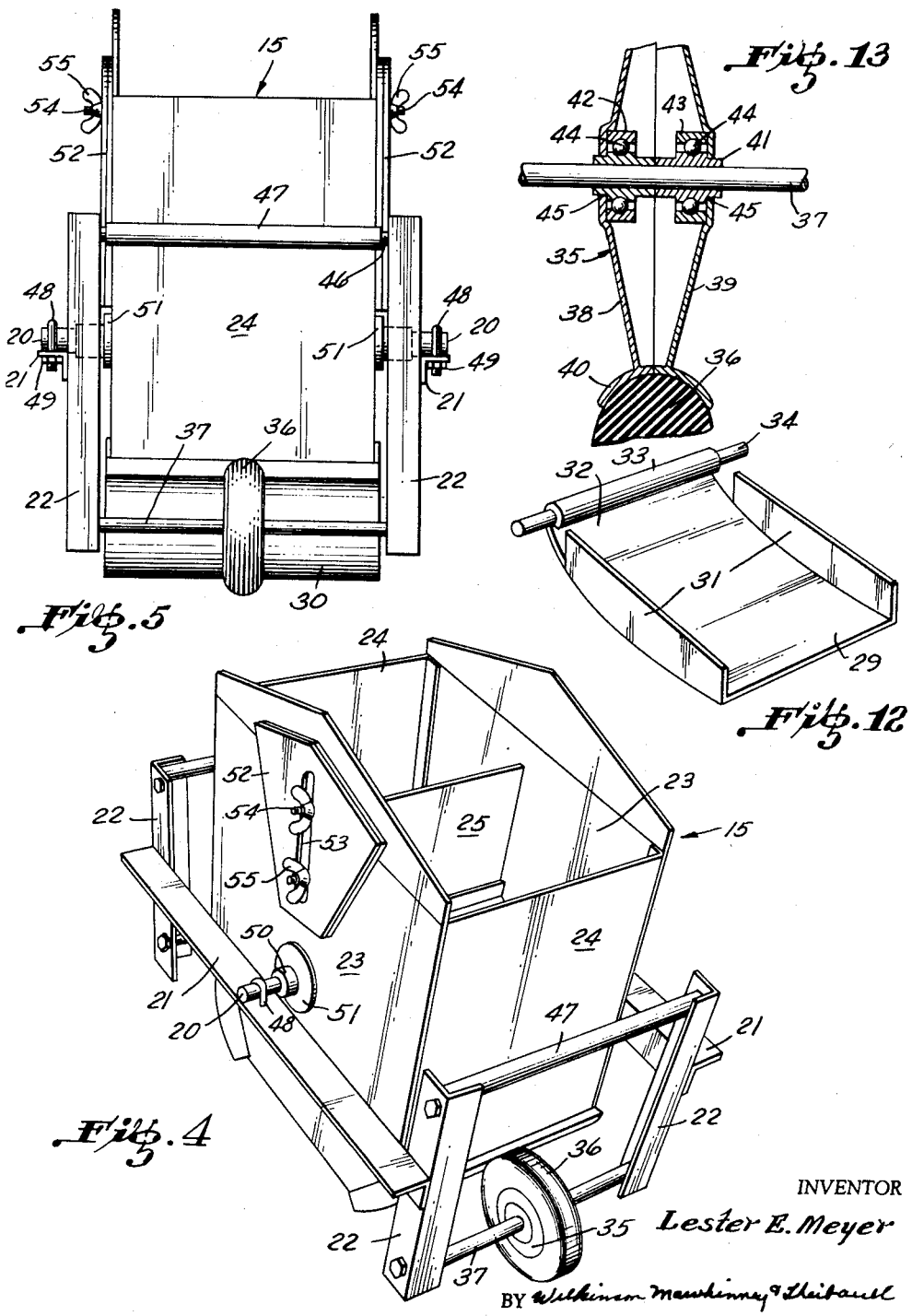

June 28, 1960  L. E. MEYER  2,942,835
AUTOMATIC WEIGHER FOR CATTLE FEED
Filed May 8, 1958  4 Sheets-Sheet 3
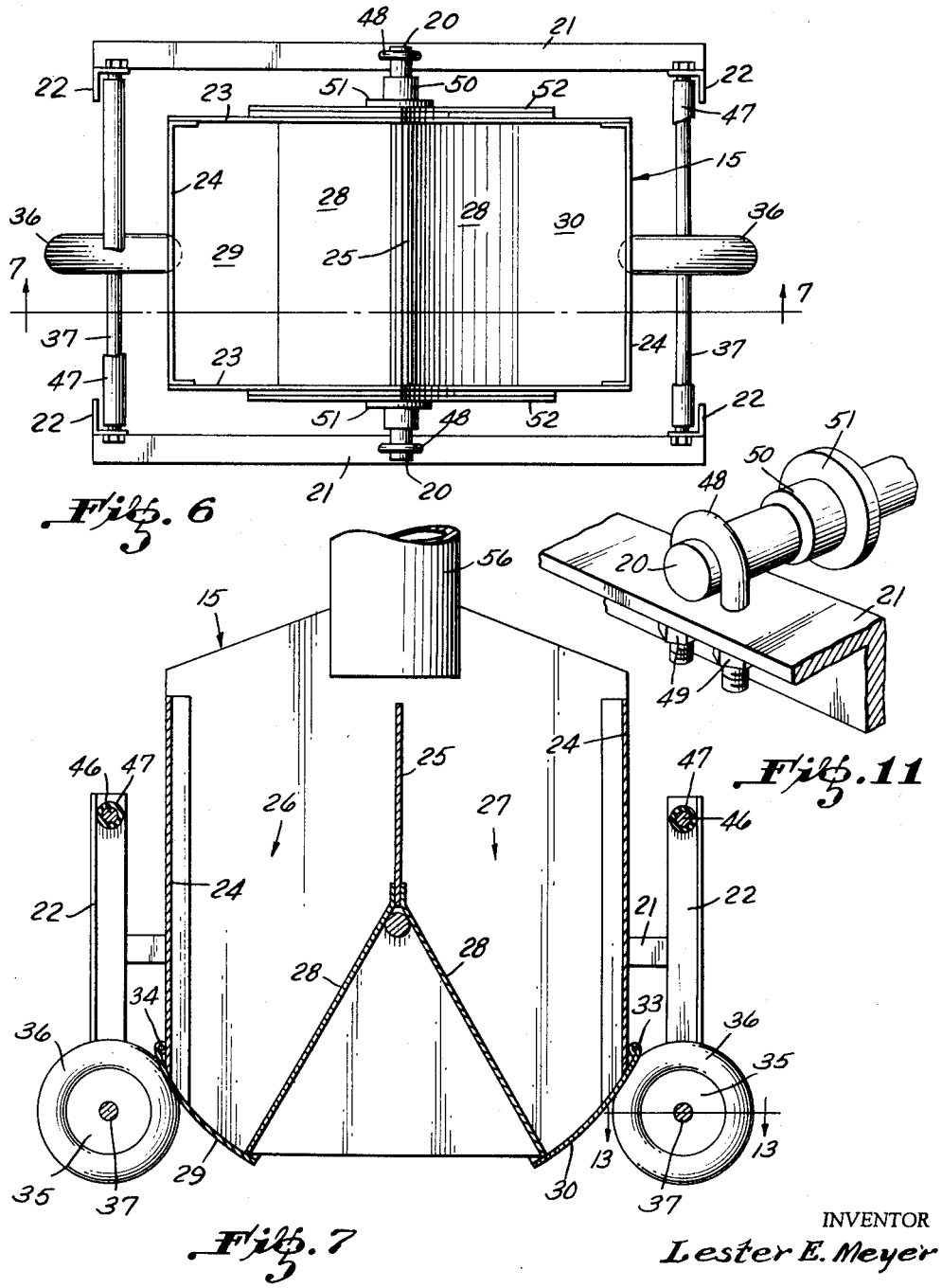

June 28, 1960  L. E. MEYER  2,942,835
AUTOMATIC WEIGHER FOR CATTLE FEED
Filed May 8, 1958  4 Sheets-Sheet 4
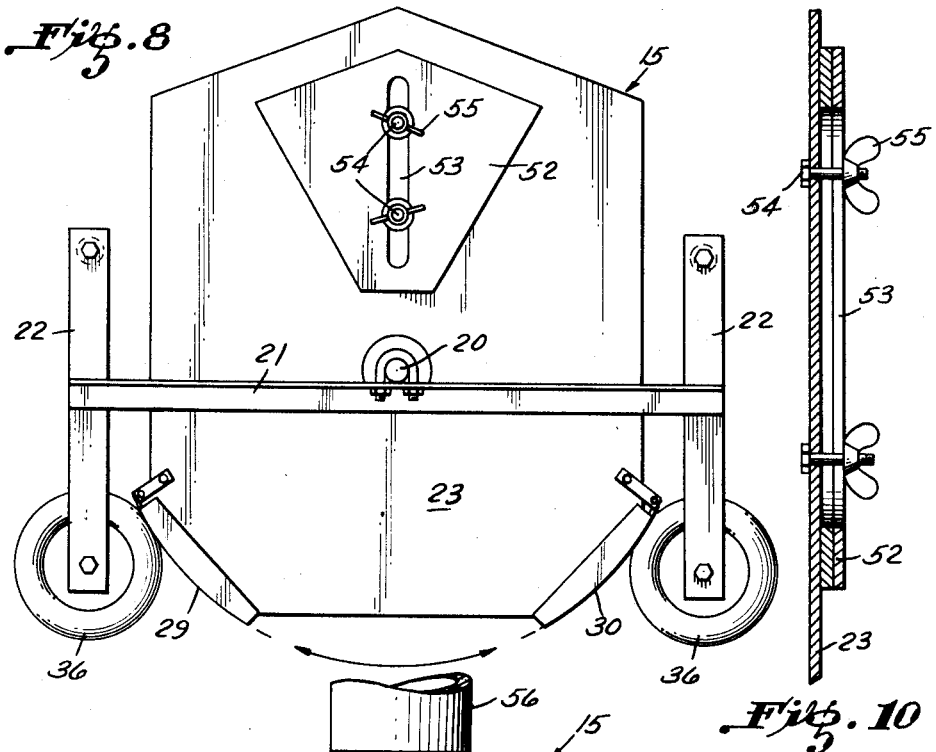
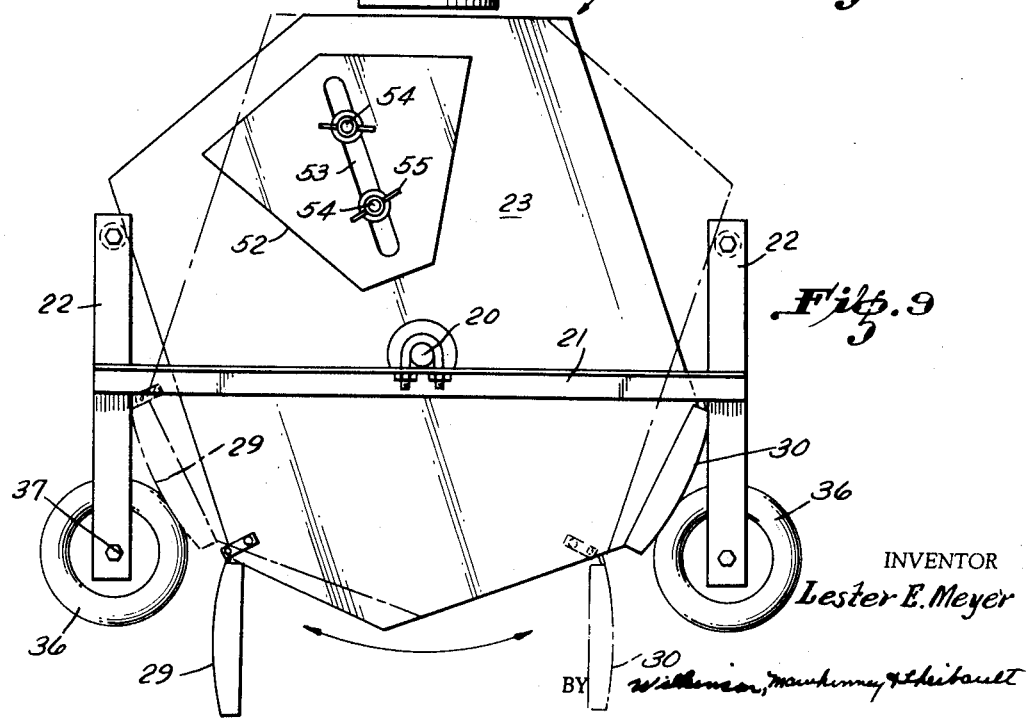
INVENTOR
Lester E. Meyer
BY
ATTORNEYS ло
United States Patent Office 2,942,835
Patented June 28, 1960

2,942,835
AUTOMATIC WEIGHER FOR CATTLE FEED
Lester E. Meyer, R.F.D. 1, Olin, Iowa Filed May 8, 1958, Ser. No. 733,946

3 Claims. (Cl. 249—33)

The present invention relates to automatic weigher for cattle feed and the like and has for an object to receive the feed from a silo or other source of supply and weigh the material as it is received from the silo and passed onto a truck, feed trough or the like.

The invention has for its purpose to avoid the indiscriminate withdrawal of uncalculated and uncontrolled amounts of the feed and the haphazard requisition by guess work rather than accurate calculation, and the invention has for its object to provide a weighing device which will be automatic and accurate in action, which will be inexpensive to build, will involve no power requirements but is operable purely by the weight of the material weighed and which will permit withdrawals from the silo or other supply of exact amounts of the feed or other material, which amounts are visibly made known to the farmer and which may be recorded, if desired, upon suitable counters or registers.

The invention has for its further purpose the orderly and clean withdrawal and distribution of the feed without spilling or loss of the feed or requiring any mopping up operation after the delivery of the feed.

A still further object of the invention resides in providing a weighing device involving a two-compartment oscillating hopper which will rotate between two positions for the purpose of alternately filling and evacuating opposed compartments with means for automatically opening and closing the bottom hopper doors or gates and for maintaining such gates tightly closed against leakage of feed when the compartments of the hopper are in the filling positions.

It is a further object of the invention to provide an automatic weigher for cattle feed and the like in which an adjustable plate weight is mounted upon one or both sides of the hopper in position to be manually adjusted for the purpose of altering the quantity of feed deliverable by the hopper compartments of the device when in the delivery position, the weights regulating the amount of feed delivered to the hoppers and causing variable shifting movement of the hopper incident to the adjusted position of the weight or weights so that a greater or lesser quantity of the feed is allowed to be delivered to any compartment at any particular weighing operation.

The invention also involves a rigid and adequate frame for the oscillating hopper in which parts of the frame act as limit stops to define and control the extent of the oscillating movement of the hopper, while such frame also provides mounting and support for large diameter cushion wheels which receive and roll upon the outer surfaces of the swinging hopper doors or gates for the purpose of closing the same during the filling phase of the cycle of oscillating movement of the hopper, such wheels having compressible rubber tires which are so related to the discharge gates or doors that the door will compress the tire when it rolls up on the same as an accompaniment to the shifting swinging movement of the hopper.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is an isometric view of a form of automatic weigher for cattle feed constructed in accordance with the persent invention and showing one mode of suspension of the same.

Figure 2 is a side elevational view of a silo illustrating one position of the automatic weigher to receive the ensilage therefrom, it being noted that the automatic weigher is suspended at an elevation so that a truck or other vehicle may be run beneath the weigher to receive the measured quantities of feed therefrom.

Figure 3 is a fragmentary front elevational view of the silo and the automatic weigher of this invention.

Figure 4 is an isometric view taken on an enlarged scale from an elevation above the weigher and showing the weigher in a substantially neutral position.

Figure 5 is an end elevational view of the same.

Figure 6 is a top plan view of the automatic weigher.

Figure 7 is a vertical longitudinal sectional view taken on the line 7—7 in Figure 6.

Figure 8 is a side elevational view of the automatic weigher in a neutral position.

Figure 9 is a similar view showing in full and dotted lines the opposite limits of oscillating movement of the hopper and also showing complementally the discharge doors or gate in corresponding open and closed positions.

Figure 10 is a vertical sectional view taken through the plate weight and a side wall of the hopper.

Figure 11 is a fragmentary isometric view taken on an enlarged scale with parts broken away and parts shown in section of a detail of one form of bearing for the shaft of the tumbling hopper.

Figure 12 is an isometric view of a form of discharge gate or door employed.

Figure 13 is a horizontal section taken on the line 13—13 of Figure 7.

Referring more particularly to the drawings and for the present to Figures 1, 2 and 3, a two-compartment oscillating weighing hopper 15 is shown as supported by hangers 16 from overhead beams 17 beneath the discharge chute 18 of a silo 19 or the like with clear space below the weighing hopper for the passage of trucks or for other receivers of the measured feed as delivered by the automatic weigher.

Figures 2 and 3 show only one possible relative position of the automatic weigher with respect to the silo, and it will be understood that any suitable framework will support the automatic weighing device from the silo or from the surrounding ground and the automatic weigher may be placed a further distance away from the silo if desired and a suitable extension chute may be provided for conveying the feed to the automatic weigher.

The weighing hopper may be suitably supported by stub shafts 20 having bearing and support on side beams 21 of a frame including also the corner standards 22 of angle iron or other suitable mechanical form.

The hopper 15 is suitably constructed of side walls 23 and end walls 24 united by welding, brazing or other suitable method, said hopper 15 including a septum or central partition 25 dividing the hopper into opposed compartments 26 and 27 having sloping lower divergent walls 28 leading to exits controlled by doors 29 and 30.

These doors are more particularly shown in Figure 12 as being of concavo-convex form having side flanges 31 which may fit either within or without the side walls 23.

The doors are in the form shown in Figure 12 provided with bottom extensions 32 terminating in rolled bearings 33 which freely rotate about pins or trunnions 34 carried by the end walls 24.

The convex outer sides of the doors 29, 30 are presented to wheels 35 having compressible rubber tires 36, such wheels being rotatably mounted about axles 37 mounted across ends of the device outwardly beyond the walls 24 and connecting the lower ends of corner standards 22 at the lower portions thereof.

These wheels are more particularly illustrated in Figure 13 as comprising discs 38 and 39 carrying at their outer ends a rim 40 to which the annular tire 36 is affixed.

Inner race sleeves 41 are fixed to the non-rotary axles 37 and outer rotary race rings 42 and 43 are arranged outwardly of the inner race sleeves 41 with ball bearings 44 interposed between the inner and outer parts 41, 42 and 43. The rotary discs 38, 39 abut against shoulders 45 of the inner race sleeves 41 so as to preserve the alignment of the wheels centrally of the convex outer surfaces of the doors 29, 30.

Stop rods 46 are also disposed in spaced relation to the walls 24 and extend across corner standards 22. These rods are preferably equipped with rubber sleeves 47 to eliminate noise and jarring when the upper portions of the end walls 24 of the hopper strike said rubber sleeves 47 which together with the rods 46 act as stops to predetermine the degree of throw of the oscillating hopper 15.

It will be apparent, particularly from Figure 4 that the non-rotary axles 37 and the non-rotary rods 46 form with the corner standards 22 to which they are attached in vertically spaced relation rectangular frames spaced from the ends of the hopper 15. These rectangular frames are of great strength and through the side beams 21 and shafts 20 they serve to support the hopper 15 and its load. At the same time these rigid and strong end frames subserve two additional purposes that is they support the wheels for closing the doors 29, 30 in alternation and also act as stops for the alternating tilting movement of the hopper 15 from end to end.

As shown more particularly in Figure 11, U-bolts are fitted over outer end portions of the stub shafts 20 with the free ends of such bolts extending through holes in the side beams 21 and having nuts 49 threaded upon the bolt ends beneath the horizontal webs of the members 21. The stub shafts 20 carry sleeves 50 having flanges 51 extending over rather extensive areas of the side walls 23 of the hopper 15 and affixed thereto as by welding, bolting or otherwise in order to sustain the hopper 15 for its oscillating movement.

To assist the load in automatically operating the hopper, triangular weight plates 52 having their apex portions directed downwardly are affixed by bolts 54 outwardly of the side walls 23 of the hopper 15, such bolts passing through slots 53 in the plates 52 and having wing nuts 54 run on the bolts externally of the weight plates so as to be accessible for rotating by the hand of the operator for the purposes of adjusting the weight plates up or down on the hopper 15. The wing nuts 50 are of course loosened to effect a change in adjustment of the plates 52. After adjustment the wing nuts 55 are tightened to retain the adjustment.

The mode of operation of the device is best illustrated in Figure 9. Initially the hopper 15 is tilted manually for instance, to the full line position indicated in Figure 9 where the right hand compartment 27 will be below the delivery spout 56 so that feed from the silo or other source will be permitted to descend under suitable control into the right hand compartment 27. Once the hopper is tilted over manually the weight 52 will maintain the same in this position until the weight of feed introduced through the spout 56 into the right hand compartment 27 overcomes the load of such weight 52, whereupon the hopper 15 will tilt over in the opposite direction to the dotted line position of Figure 9. In moving to this dotted line position the discharge gate 30 will move off the wheel 36 and drop down to the dotted line position indicated opening the exit opening at the lower end of the right hand compartment 27 and allowing the feed to gradually discharge therefrom into a waiting receptacle, truck body or the like.

Incident to this tilting movement of the hopper 15 to the dotted position of Figure 9, the opposed gate 29 will move up on the wheel 36, the wheel rotating therewith so that the gate 29 is automatically closed at the same time that the left compartment 26 of the hopper is brought beneath the delivery spout 56. The rate of delivery of the feed and other material through the spout 56 can be regulated so that the right hand compartment 27 completes evacuation approximately at the same time that the left hand compartment 26 is filled to a capacity which will over balance the weight 52 and cause a re-tilting of the hopper 15 back to the full line position of Figure 9 at which time the convex surface of the gate 30 will ride up on the wheel 36 and close while the opposite gate 29 is freeing itself from the opposite wheel and dropping down to open position.

In this way the hopper will tilt back and forth automatically without the application of any power but simply by the alternate transfer of the load of the feed in sequence from one compartment 26 to the other compartment 27. By providing these compartments of pre-selected volume and capacity and adjusting the weight 52 the charges of the feed as to weight and volume can be very accurately calculated so that for a given number of alternating oscillating movements of the hopper a predetermined quantity of the feed may be delivered. A counter or register may be applied to count the number of alternations of the hopper and in this way establish by record the quantity of the feed which has been dispensed. By the use of this invention farmers will become accustomed to calling for accurate amounts of feed to satisfy stock requirements, which vary from time to time, and thus there will be no waste to the feed and substantial saving in that over supplies may not be ordered at useless additional expense.

By adjusting the weight 52 toward or from the center of oscillation 20, the effective load of the weight 52 in relation to quantities of grain delivered to the compartments may be very nicely regulated to deliver charges of feed of accurate volume and weight. Due to the triangular shape of the weight plates 52 and the fact that the apexes thereof are directed downwardly and in juxtaposition to the oscillation centers 20 while the broad bases of the triangles are uppermost and the side edges diverge upwardly in opposite directions from the center line of the slots 53, the weight distribution is more effective in activating the tilting actions and the weight adjustments are more sensitive, all of which promotes accuracy in the delivery of exact quantities of the feed.

Now it will be understood that as the convex lower surfaces of the discharge gates 29 and 30 ride upwardly on the wheels and particularly on the compressible rubber tires 36 of the same, a compression of the tires 36 will take place resulting in a distortion of the rubber body of the tires which is, of course, elastic and the inherent elasticity will tend to restore the distortion which will result in great elastic pressure exerted against the gates 29 and 30 for snapping the same to a closed position and for retaining these gates tightly closed when opposite compartments are being filled. This assures no discharge of any feed except at such times as these discharge gates are fully opened. The arcs about which the convex outer surfaces of the gates 29 and 30 are struck are generated from the center line of the stub shafts 20 about which the oscillatory action of the hopper is executed. Thus the position of the outer treads of the rubber tires 36 may be nicely regulated as to opsition relatively to the doors 29 and 30 and the arcs of movement of the same so that the unsprung condition of the rubber bodies of the tires will to a desired extent overlap these arcs of movement whereby the convex surfaces of the doors in moving upon the tires act under a compulsion to compress the tires out of such overlapping relationship and thus elastically stress the tires with the reaction against the discharge gates as hereinabove mentioned.

Farmers will find the device particularly useful as an adjunct to silos in weighing automatically the ensilage as it is delivered from the silo. Of course it will be understood that the invention has uses in other connections and may be employed with other materials besides cattle feed.

Although I have disclosed herein the best form of the invention known to me at this time, I reserve the right to all such modifications and changes as may come within the scope of the following claims.

What is claimed is:

1. In an automatic weigher for cattle feed and the like of the type in which two compartments of an oscillating hopper are adapted to be alternately fed by a supply spout dependent upon the compartment which at any time lies beneath the spout, and in which the compartments have separate discharge openings at their lower ends controlled by gravity opening discharge gates, and in which means are provided for alternately closing the gates of the compartments receiving the supply of feed, a susbtantially triangular weight plate operatively coupled to said hopper with its apex disposed downwardly toward the center of oscillation of the hopper, and means for selectively positioning said weight plate toward and from the center of oscillation.

2. In an automatic weigher for cattle feed and the like of the type in which two compartments of an oscillating hopper are adapted to be alternately fed by a supply spout dependent upon the compartment which at any time lies beneath the spout, and in which the compartments have separate discharge openings at their lower ends controlled by gravity opening discharge gates, and in which means are provided for alternately closing the gates of the compartments receiving the supply of feed, a weight mass having divergent sides operatively coupled to said hopper with divergent sides positioned uppermost and having the minimum divergency disposed downwardly toward the center of oscillation of the hopper, and means joining said weight mass and hopper for selectively positioning said weight mass toward and from the center of oscillation.

3. An automatic weigher for cattle feed as claimed in claim 2 wherein said weight mass has a slot therethrough through which passes shaft means carried by the hopper and which receives and retains retaining means positioned to bear against the weight mass and retain said weight mass in a preselected position toward and from the center of oscillation.

References Cited in the file of this patent

UNITED STATES PATENTS

| | | |
|---|---|---|
| 345,353 | Witt | July 13, 1886 |
| 377,433 | Lieb | Feb. 7, 1888 |
| 394,665 | Springer et al. | Dec. 18, 1888 |
| 441,225 | Black | Nov. 25, 1890 |
| 525,765 | Kanne | Sept. 11, 1894 |